C. C. TITTLE.
Flour and Meal Scoop, Measure, and Sieve.
No. 201,301. Patented March 12, 1878.
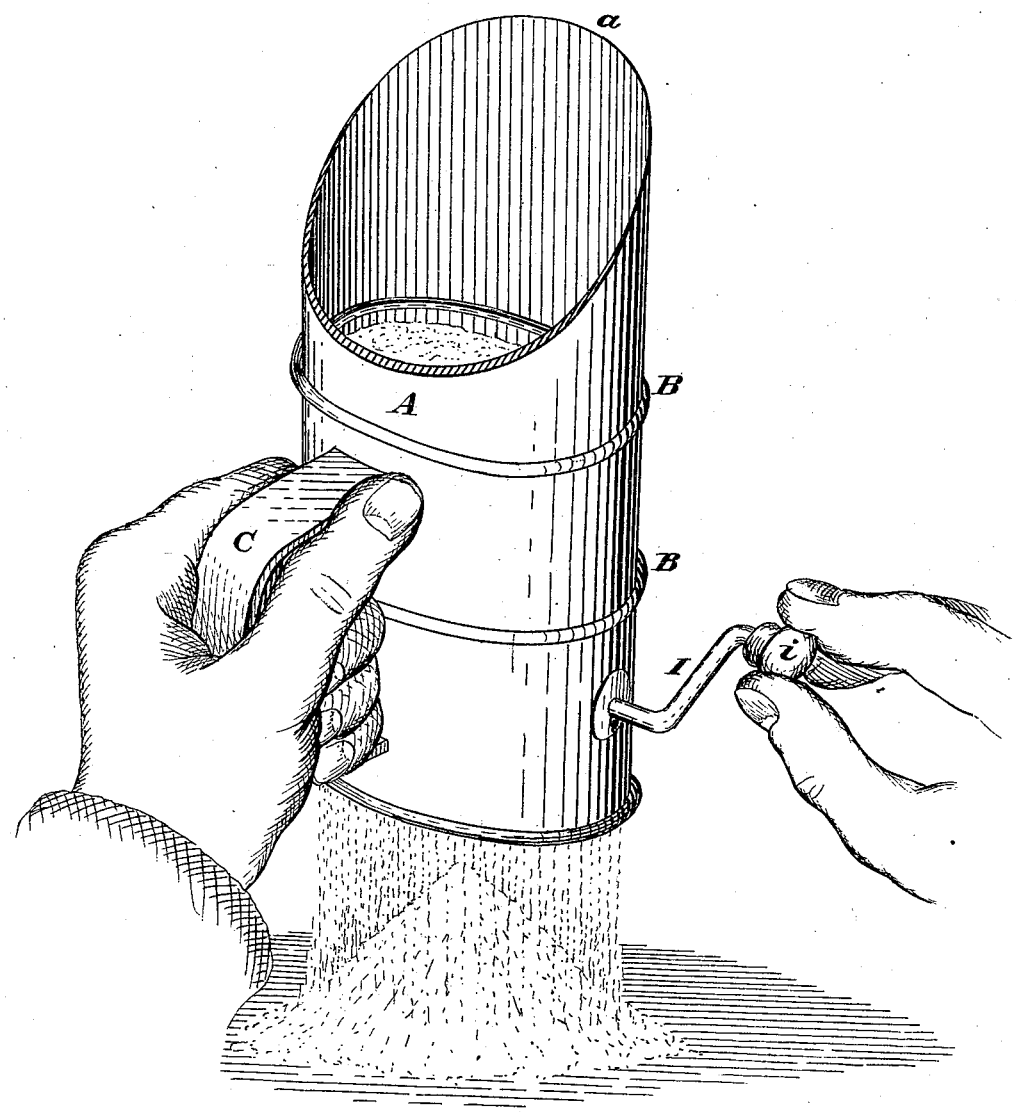

2 Sheets—Sheet 2.
C. C. TITTLE.
Flour and Meal Scoop, Measure, and Sieve.
No. 201,301. Patented March 12, 1878.
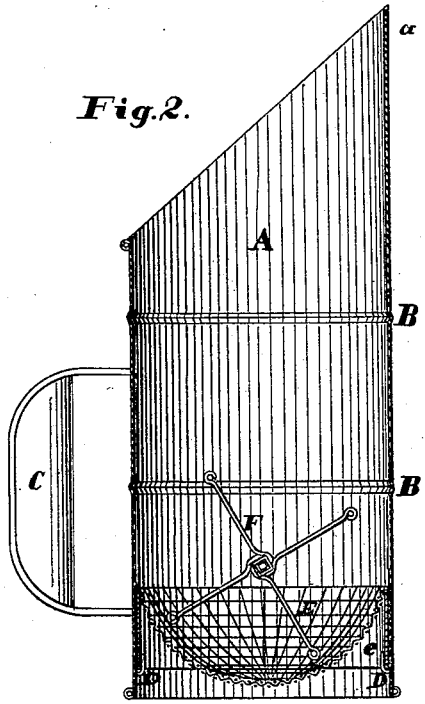
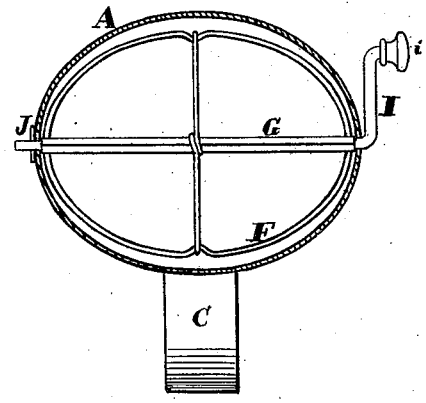
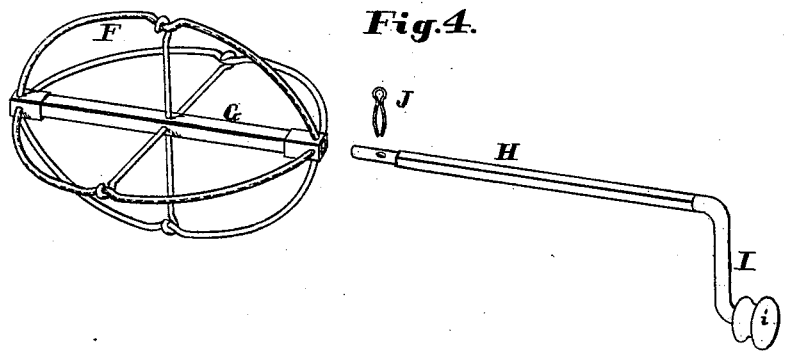
Attest
Walter Knight
L. Knight
Inventor
Christopher C. Tittle
By Knight Bros
Attys.

UNITED STATES PATENT OFFICE.

CHRISTOPHER C. TITTLE, OF CINCINNATI, OHIO, ASSIGNOR OF ONE-HALF HIS RIGHT TO WILLIAM B. SHEPPARD, OF SAME PLACE.

IMPROVEMENT IN FLOUR AND MEAL SCOOP, MEASURE, AND SIEVE.

Specification forming part of Letters Patent No. 201,301, dated March 12, 1878; application filed February 14, 1878.

*To all whom it may concern:*

Be it known that I, CHRISTOPHER C. TITTLE, of Cincinnati, Hamilton county, Ohio, have invented a new and useful Flour and Meal Scoop, Measure, and Sieve; and I do hereby declare the following to be a full, clear, and exact specification of the same.

My invention relates to improvements in household and kitchen utensils, and unites in itself the functions of a scoop, a graduated measure, a sieve, and a fruit-strainer, the device being adapted for scooping, measuring, and sifting flour, meal, baking-powder, sugar, salt, and other ground or pulverulent substances.

My device is also available for straining cooked fruits, jellies, sirups, &c.

In the accompanying drawings, Figure 1 is a perspective view of the device, showing the same in operation. Fig. 2 is a vertical section of the same at right angles to the beater-shaft. Fig. 3 is a horizontal section in the plane of the beater-shaft. Fig. 4 shows the beater and shaft detached.

A is a tubular case, of tin or other sheet-metal. This tube terminates obliquely at top, so as to form a convenient scoop or lip, $a$. Circumferential creases or beads B serve to designate different capacities—such as pints, quarts, &c.

The form of my scoop is preferably oval or elliptical in transverse section, with the obliquity of the lip in direction of the minor axis, as herein illustrated; but a circular tube may be employed without wholly departing from my invention.

On the flat side of the tube A, most remote from the lip $a$, is attached a convenient loop-handle, C. Secured by clips D, near the bottom of the tube, on the inner wall thereof, is my sieve or strainer E, in the form of a half-spheroid. Adapted to revolve within and to nearly touch the sieve E, and of corresponding shape therewith, is my beater, formed of wires F, bowed to a spheroidal form, which wires are permanently soldered to a square hub, G, to receive the operative shaft H, having crank I, and which, penetrating entirely through the tube, is secured on the remote side by a pin, J.

My sieve E is made of woven wire, bent to the proper hemispheroidal shape, and soldered to a sheet-metal band, $e$. One or all the interior members may be easily removed by first withdrawing the pin J and shaft H, and then slipping the beater F and sieve E out through the top of the scoop.

The crank I has, preferably, a button or handle, $i$, capable of revolving freely upon it.

I claim as new and of my invention—

The combination of tube A, perforated transversely for shaft H, the pin I, clips D, strainer E, and tubular agitator F G, the whole being arranged for the easy withdrawal and replacement of the parts, in the manner explained.

In testimony of which invention I hereunto set my hand.

CHRISTOPHER C. TITTLE.

Attest:
GEO. H. KNIGHT,
L. H. BOND.